(12) United States Patent
Ricketts (10) Patent No.: US 9,033,780 B2
(45) Date of Patent: May 19, 2015

(54) BIOMASS FEED SYSTEM USING AN AIR BLANKET FOR IMPROVED DISTRIBUTION WITHIN A COLLECTION DEVICE

(75) Inventor: Jonathan E. Ricketts, Ephrata, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 13/498,414

(22) PCT Filed: Sep. 27, 2010

(86) PCT No.: PCT/US2010/050346
§ 371 (c)(1),
(2), (4) Date: Apr. 25, 2012

(87) PCT Pub. No.: WO2011/041251
PCT Pub. Date: Apr. 7, 2011

(65) Prior Publication Data
US 2012/0208610 A1    Aug. 16, 2012

Related U.S. Application Data

(60) Provisional application No. 61/277,758, filed on Sep. 29, 2009.

(51) Int. Cl.
| *A01F 12/30* | (2006.01) |
| *A01D 90/02* | (2006.01) |
| *A01F 11/06* | (2006.01) |
| *A01D 45/02* | (2006.01) |

(52) U.S. Cl.
CPC ............... *A01D 90/02* (2013.01); *A01F 11/06* (2013.01); *A01D 45/02* (2013.01)

(58) Field of Classification Search
USPC ............... 460/111, 112, 100, 26, 99, 23; 56/320.2, 202; 209/137
See application file for complete search history.

(56) References Cited

U.S. PATENT DOCUMENTS

| 2,935,193 | A | * | 5/1960 | Karlsson | 209/136 |
| 3,071,246 | A | * | 1/1963 | Schimke | 209/27 |
| 3,630,009 | A | * | 12/1971 | Ashton | 56/11.9 |
| 3,689,119 | A | * | 9/1972 | Weichel et al. | 406/162 |
| 3,721,075 | A | * | 3/1973 | Weiberg | 56/13.5 |
| 3,772,860 | A | * | 11/1973 | Weiberg | 56/13.5 |
| 3,952,889 | A | * | 4/1976 | Wanker et al. | 406/39 |
| 4,121,778 | A | * | 10/1978 | Quick | 241/79 |
| 4,147,017 | A | * | 4/1979 | Cortopassi et al. | 56/16.5 |
| 4,287,707 | A | * | 9/1981 | Persoons et al. | 56/12.8 |
| 4,631,909 | A | * | 12/1986 | McLane | 56/202 |
| 4,738,088 | A | * | 4/1988 | Klever et al. | 56/202 |
| 5,193,331 | A | * | 3/1993 | Quandt | 56/12.8 |
| 5,930,987 | A | * | 8/1999 | Urich et al. | 56/14.5 |

(Continued)

*Primary Examiner* — Árpád Fábián-Kovács
(74) *Attorney, Agent, or Firm* — Seyed V. Sharifi T.; Patrick M. Sheldrake (57) ABSTRACT

A biomass feed system includes a device to propel an airborne flow of the biomass along a trajectory within a collection device. At least one air flow port is disposed and operable in cooperation with at least one fan for discharging a flow of air for creating a blanket of pressurized air within the interior cavity beneath the trajectory for supporting and extending a distance of travel of the biomass within the collection device. The collection device can include an air flow outlet adjacent to a terminal end of the trajectory, to and through which the pressurized air will flow, in a manner for lifting and carrying at least some of the airborne biomass farther into the interior cavity. And, vanes or other elements can be provided to used to achieve better sideward distribution.

5 Claims, 6 Drawing Sheets

(56) References Cited

U.S. PATENT DOCUMENTS

| | | | | |
|---|---|---|---|---|
| 5,941,768 A * | 8/1999 | Flamme | ................ | 460/114 |
| 6,148,595 A * | 11/2000 | Rabe et al. | ................ | 56/320.2 |
| 6,358,141 B1 * | 3/2002 | Stukenholtz et al. | ................ | 460/100 |
| 7,524,242 B2 * | 4/2009 | Stukenholtz et al. | ................ | 460/115 |
| 7,566,266 B1 * | 7/2009 | Ricketts et al. | ................ | 460/101 |
| 7,651,391 B2 * | 1/2010 | Weichholdt et al. | ................ | 460/111 |
| 7,731,578 B2 * | 6/2010 | Birrell et al. | ................ | 460/100 |
| 7,811,161 B1 * | 10/2010 | Ricketts et al. | ................ | 460/26 |
| 7,837,542 B1 * | 11/2010 | Ricketts et al. | ................ | 460/99 |
| 7,862,411 B1 * | 1/2011 | Ricketts et al. | ................ | 460/23 |
| 7,927,198 B2 * | 4/2011 | Redekop et al. | ................ | 460/99 |
| 8,113,353 B2 * | 2/2012 | Redekop et al. | | |
| 8,251,788 B2 * | 8/2012 | Stukenholtz et al. | ................ | 460/79 |
| 8,286,798 B2 * | 10/2012 | Ricketts et al. | ................ | 209/138 |
| 2007/0209974 A1 | 9/2007 | Lees | | |
| 2009/0095662 A1 * | 4/2009 | Redekop et al. | ................ | 209/509 |
| 2009/0104952 A1 * | 4/2009 | Redekop et al. | ................ | 460/80 |
| 2009/0124309 A1 * | 5/2009 | Redekop et al. | ................ | 460/100 |
| 2009/0264169 A1 | 10/2009 | Ricketts | | |
| 2010/0193411 A1 * | 8/2010 | Redekop et al. | ................ | 209/509 |

* cited by examiner

BIOMASS FEED SYSTEM USING AN AIR BLANKET FOR IMPROVED DISTRIBUTION WITHIN A COLLECTION DEVICE

This application claims the benefit of U.S. Provisional Application No. 61/277,758, filed Sep. 29, 2009.

TECHNICAL FIELD

This invention relates generally to a feed system for propelling biomass into a collection device, and more particularly, which generates an air blanket below or in cooperation with an airborne flow of the biomass for extending a distance of distribution of the biomass within the collection device.

BACKGROUND ART

U.S. Provisional Application No. 61/277,758, filed Sep. 29, 2009, is incorporated herein by reference in its entirety.

With the demand for energy contained in biomass such as corn cobs, demand for equipment to harvest the biomass has increased dramatically. This has thus created a need for modifications to equipment that has existed in the marketplace, as well as for completely new equipment. Some of the challenges that must be overcome include the loading, moving, transporting and refining the harvested biomass.

The system of the invention has particular pertinence to the collection of cobs and fodder that is associated with the collection of cobs. This includes shucks (material that wraps around an ear of corn, also known as husks), leaf trash from the corn stalk, as well as the cornstalk.

Particularly with regard to corn, there is a great deal of biomass material other than the corn kernels that has to be handled. When harvesting corn using a combine harvester, the combine takes the ear of corn into the threshing chamber of the combine. Along with the corn one also gathers a high volume of material other than corn ears. Although in past years it has been desirable to leave the material other than the ear of corn outside of the combine, it is now more desirable to collect some of the material collected separate from the grain obtained off of the corn cob. The cobs are thus desired to be collected into a container or collection device that is to be provided in some fashion. It is understood with knowledge of the corn plant that the collection of the cobs requires a much larger collection device than that required for collection of the kernels, which have been easily collected for years. The collection device for the cobs thus must be larger due to the physical size of the cobs. The cobs are generally also a compact part of the corn plant, but are still much larger than the kernels.

With the cobs being compact, they have aerodynamic properties, sufficiently greater mass, and other properties that give them a tendency to be capable of being propelled in an airborne manner, in any of several ways, a greater distance compared to other elements of the biomass, particularly when fed in this manner into a collection device. For instance, shucks or husks, leaf trash, and the like, are not compact, but are of a more paper like consistency, are less aerodynamic, have less mass, and have been found not to travel very well when propelled in the same airborne manner as the cobs. Thus, if it is attempted to propel a mixture of cobs and the other biomass together into a collection device, this creates a very uneven loading within the receiving device. Generally, it has been observed that the higher mass cobs will travel farther within the collection device, and are much easier to distribute. However, when a substantial volume of shucks and leaf trash are added to the cobs the volume of material being collected is much larger. This presents a problem of how to more evenly distribute the mixture of biomass in the collection device, in both the front to back as well as side to side directions. One may address this problem in several ways, e.g., using augers, rakes, and/or other mechanical devices or operations. A shortcoming of this approach, however is that it is costly, and the apparatus is heavy and occupies space that could otherwise be occupied by collected biomass.

Thus, what is sought is a biomass feed system adapted for feeding a desired mixture of biomass, e.g., cobs, husks or shucks, leaf trash, etc., to a collection device, which facilitates even distribution of the biomass within the collection device, and overcomes one or more of the problems and shortcomings set forth above.

SUMMARY OF THE INVENTION

What is disclosed is a biomass feed system adapted for improving the distribution of the biomass within a collection device, and which overcomes one or more of the problems and shortcomings set forth above.

According to a preferred aspect of the invention, the system includes a device configured and operable for propelling an airborne flow of the biomass in a predetermined direction along a trajectory within an interior cavity of a collection device. The system further includes at least one air flow port disposed in a suitable position, which can be, for instance, but is not limited to, generally below the trajectory and facing in the predetermined direction, and at least one fan, or other device, configured and operable for discharging a flow of air through the at least one air flow port, for creating a blanket of pressurized air within the interior cavity beneath the trajectory for supporting and extending a distance of travel of the biomass within the interior cavity.

According to another preferred aspect of the invention, the collection device includes an air flow outlet adjacent to a terminal end of the trajectory opposite the device at or above an elevation thereof, through which the pressurized air will escape, and to which the pressurized air will flow, in a manner for lifting and carrying at least some of the airborne biomass farther into the interior cavity.

According to another preferred aspect of the invention, the air flow port and the fan can be configured to direct the flow of air upwardly at a small acute angle to horizontal, or the trajectory, so as to intersect the flow of the biomass in a manner for lifting or maintaining the elevation of airborne elements of the biomass traveling along the trajectory, so as to travel a greater distance than if allowed to fall. This intersection of flows can occur immediately adjacent to the end of the device which propels the biomass, so as to immediately lift it, or it can occur at a more downstream location, for instance, but not limited to, where the trajectory begins to descend, just before that point, or farther along the trajectory.

According to still another preferred aspect of the invention, the at least one air flow port can be located about coincident with the end of the propelling device, or downstream of the device.

According to still another preferred aspect of the invention, the device for propelling the flow of biomass can comprise a belt type conveyor, inclined upwardly toward the region of the collection device into which the biomass is to be propelled, at an angle, and having an operating speed designed to achieve a desired distribution of the biomass within the collection device.

According to a further preferred aspect of the invention, the at least one fan can be located in spaced relation to the at least one air flow port and can be connected thereto by a tube. For instance, the fan can be located below, and/or to the side, such as beside the collection device or the propelling device. The fan can also be located above the propelling device and/or in or outside of an upper region of the collection device. As a nonlimiting example, the fan can be disposed directly below the propelling device. As an alternative, an air flow tube or duct can connect a fan or fans at a remote location to the air flow port or ports located just below the end of the device from which the biomass is propelled, or somewhere along the trajectory. As an example, an air flow port can have fans at opposite ends that generate flows of air that converge within the tube and are discharged through the port. And, the air flow port can include a plurality of vanes, including at least one vane oriented for directing a portion of the air flow sidewardly at a small acute angle to the predetermined direction, for distributing a portion of the airborne flow of the biomass sidewardly within the interior cavity. As another alternative, or in addition to the above air flow ports, an air flow port or ports can be located above the trajectory and configured and operable for generating in whole or in part, the air blanket below or in the lower region of the biomass flow. And the fan can comprise a variety of fan or blower types, including but not limited to a propeller type, or a centrifugal type.

As noted above, it has been observed that those elements of biomass having greater mass, better aerodynamic properties, e.g., corn cobs and cob fragments alone, will tend to travel farther into the collection device under the propulsion power, whereas those with less mass and/or which are less aerodynamic, will have a tendency to stall and fall or descend prematurely from the desired trajectory, e.g., cob or cob fragments with attached husks, or loose husks. The system of the invention advantageously corrects this, by supporting and/or lifting the prematurely stalling and/or falling elements using the blanket of air, such that they travel a greater distance within the collection device, and, if supported by a more sidewardly directed flow of air, will be carried in that direction, to achieve better distribution. The ability of the air flow comprising the blanket to escape through the air flow outlet, acts to generate flow toward the outlet, which will carry at least some of the biomass in that direction, but a screen or deflector over that outlet will prevent the escape of the biomass.

DETAILED DESCRIPTION OF THE INVENTION

Figure 1:
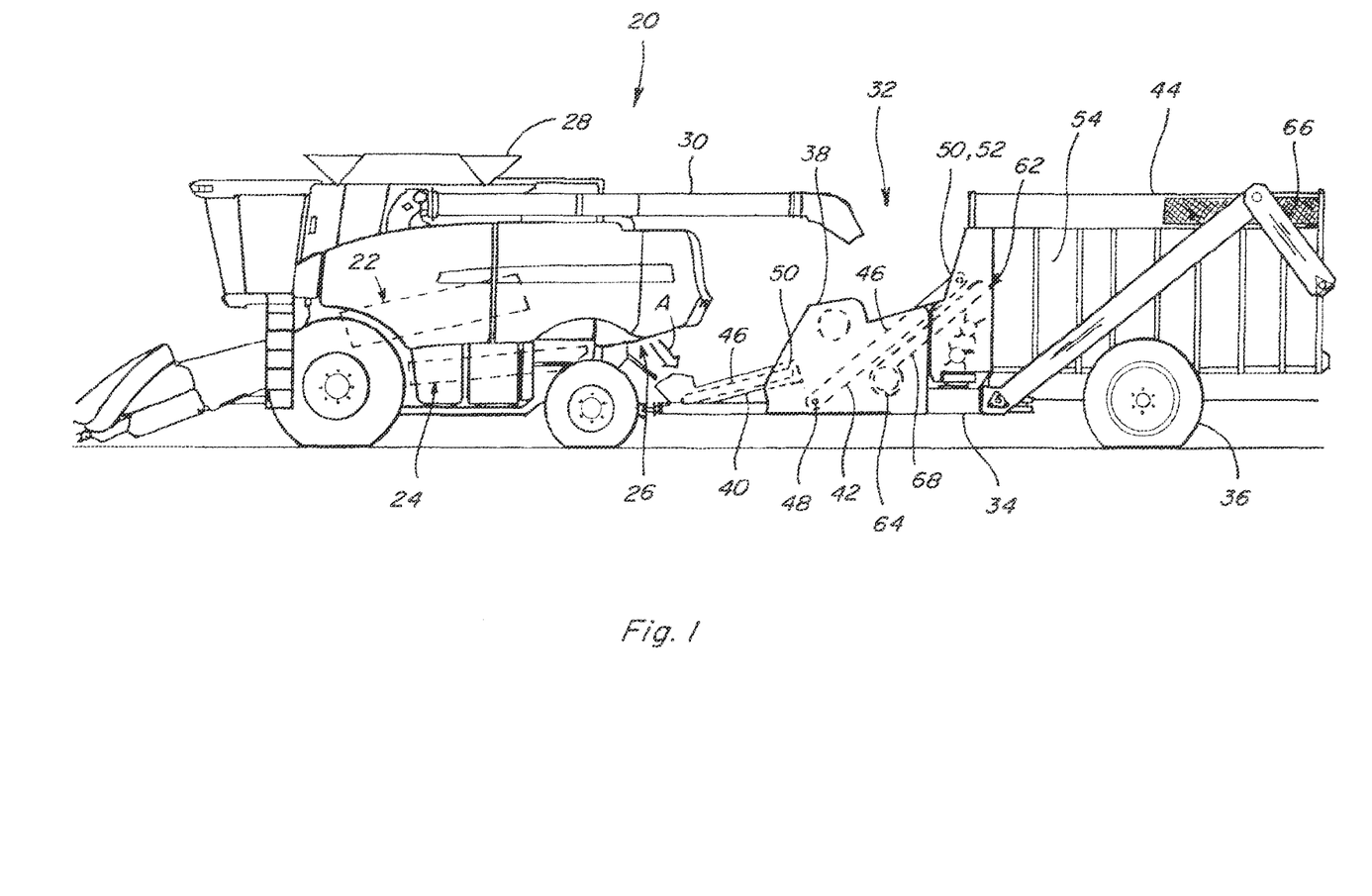
FIG. 1 is a side view of a representative harvester towing a trailer carrying a biomass feed system according to the invention.

Referring now the drawings, in FIG. 1, a representative agricultural harvesting machine 20 is shown, which is a combine constructed and operable in the well known manner for harvesting whole ears of corn from corn plants as the combine travels over a field. Combine 20 includes well known apparatus that gathers and conveys the ears of corn into a threshing system 22 within the combine which removes most of the husk surrounding the ears, and the corn kernels from cobs of the ears, and directs a flow of the corn, some of the cobs and fragments thereof, and other residue or stover lighter than the corn and cobs, such as fragments of husks, leaves, dust, and the like, within a rear chamber of machine 20 to a cleaning system 24 of the machine. At the same time, cleaning system 24 has a fan that generates an upward and rearward flow of air, utilized to separate and carry away in an airborne manner the lighter elements of other residue from the kernels, and continue to carry these lighter elements rearwardly through the internal space above system 24 to a rear discharge outlet 26. Any cobs, cob fragments and other heavier elements will also be propelled by movements of the cleaning system, to outlet 26. Also at the same time, larger residue other than corn kernels, such as loose husks, leaves and the like, which are typically of a paper like consistency and are relatively light, dust, and a large amount of cobs and cob fragments, are propelled from threshing system 22 rearwardly within the end of machine 20, and is deflected downwardly toward discharge outlet 26 on the rear end of machine 20, so as to mix with the flow from the cleaning system in the rear confines of machine 20. This mixture is then discharged through outlet 26, as denoted by arrow A.

Cleaning system 24 of combine 20 is operable in the conventional manner to separate the cobs and other larger elements of the corn residue or stover from the smaller kernels of corn and smaller elements of residue, and the corn is collected and conveyed into a clean grain tank 28 on combine 20, or other receiver. The clean corn is then periodically unloaded from tank 28 using an unloader conveyor 30 in the conventional manner, by swinging conveyor 30 to a sidewardly extending position (not shown—conveyor 30 being illustrated in a stowed or travel position here).

For the purposes of the invention, the leaves, husks or shucks, and fragments thereof, are referred to herein as lighter biomass or biomass having less mass, whereas the cobs and larger cob fragments are referred to as heavier biomass or biomass having greater mass. Generally also, the lighter biomass, e.g., husks and leaf trash, will have poorer aerodynamic characteristics, whereas the cobs will have better aerodynamic characteristics. Further, some cobs and cob fragments will have husks or husk fragments still attached which, while it increases the mass thereof, decreases the aerodynamics thereof. It will be desired to collect at least cobs, cob fragments, both with and without attached husks, and possibly some of the lighter biomass, together, which can result in the problems discussed above, and which are overcome by the system of the present invention.

Figure 2:
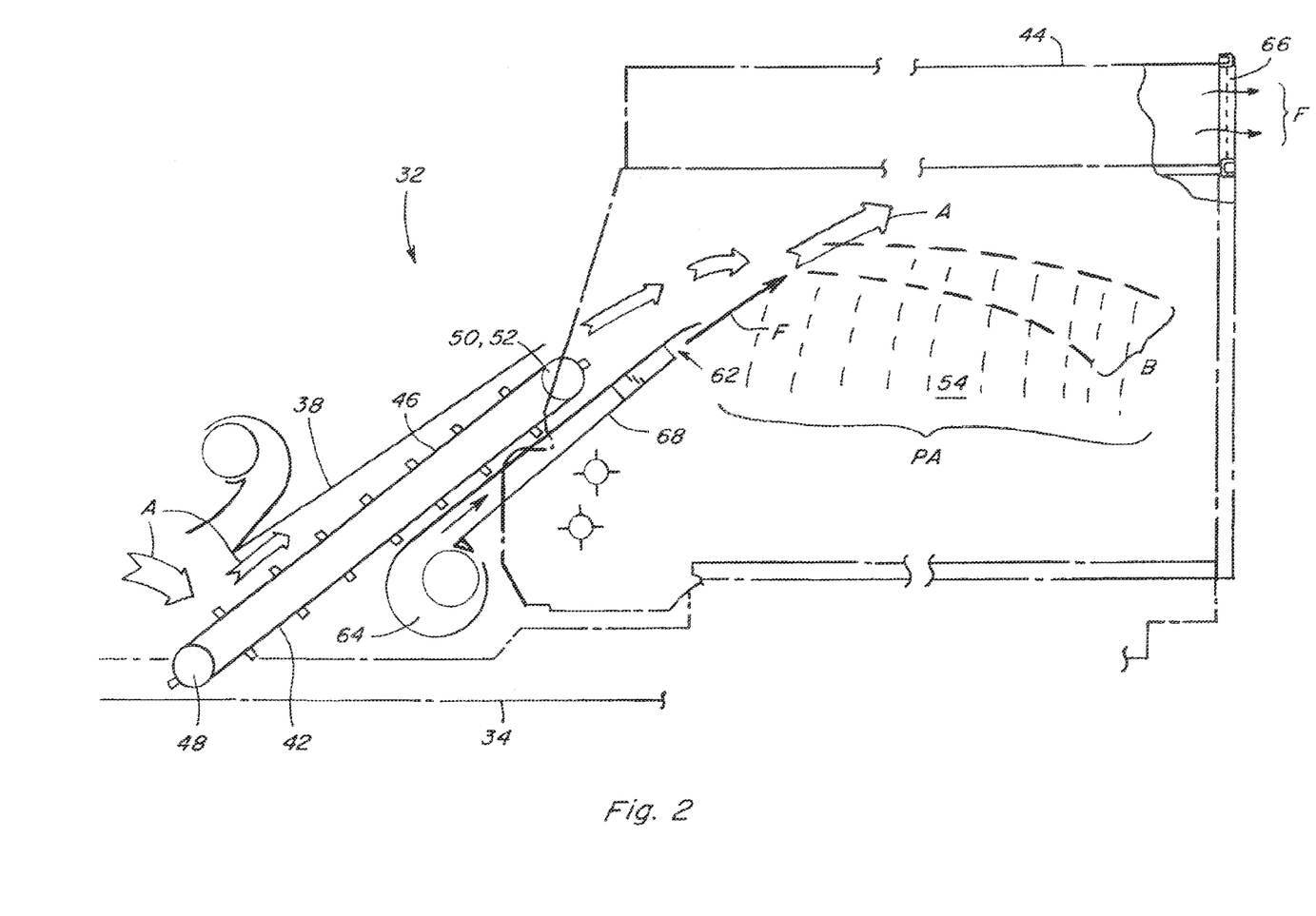
FIG. 2 is an enlarged simplified fragmentary schematic side view of the system, showing aspects of operation of the system with arrows.
Figure 3:
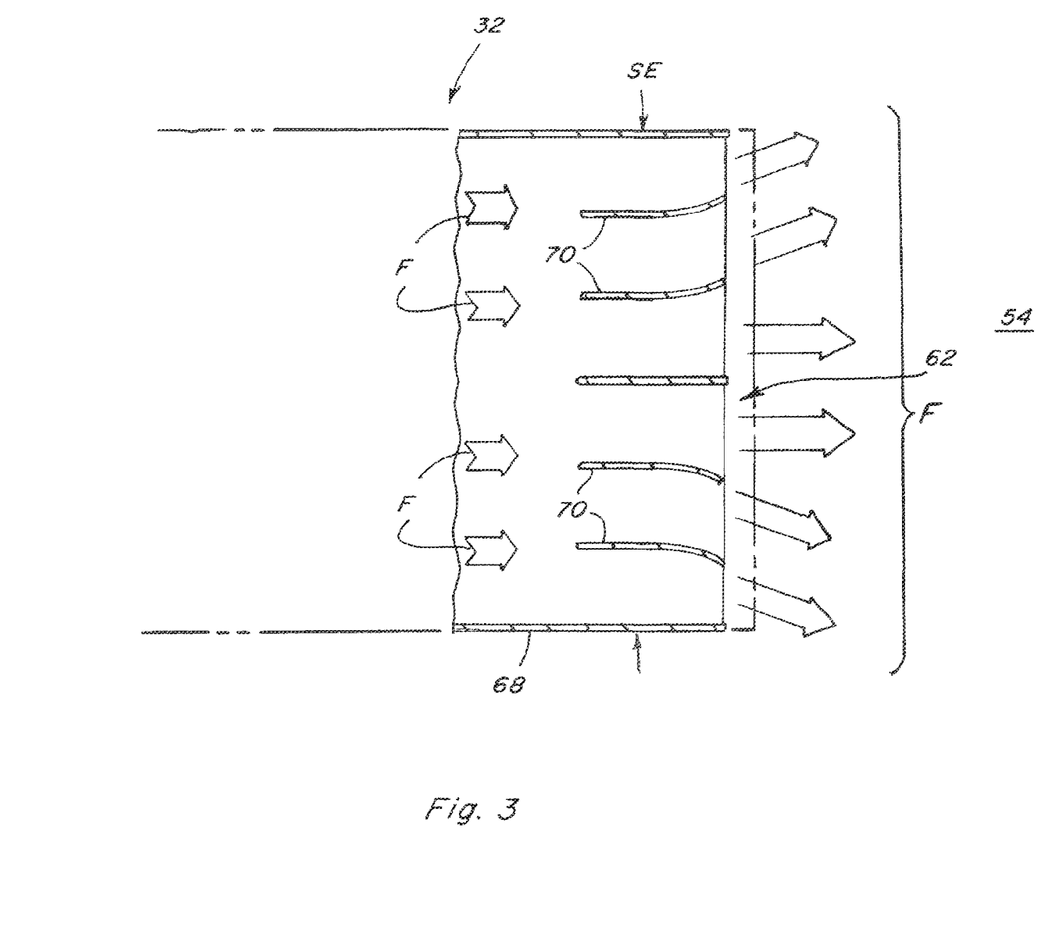
FIG. 3 is a simplified fragmentary top view of the system, showing aspects of operation of the system with arrows.
Figure 4:
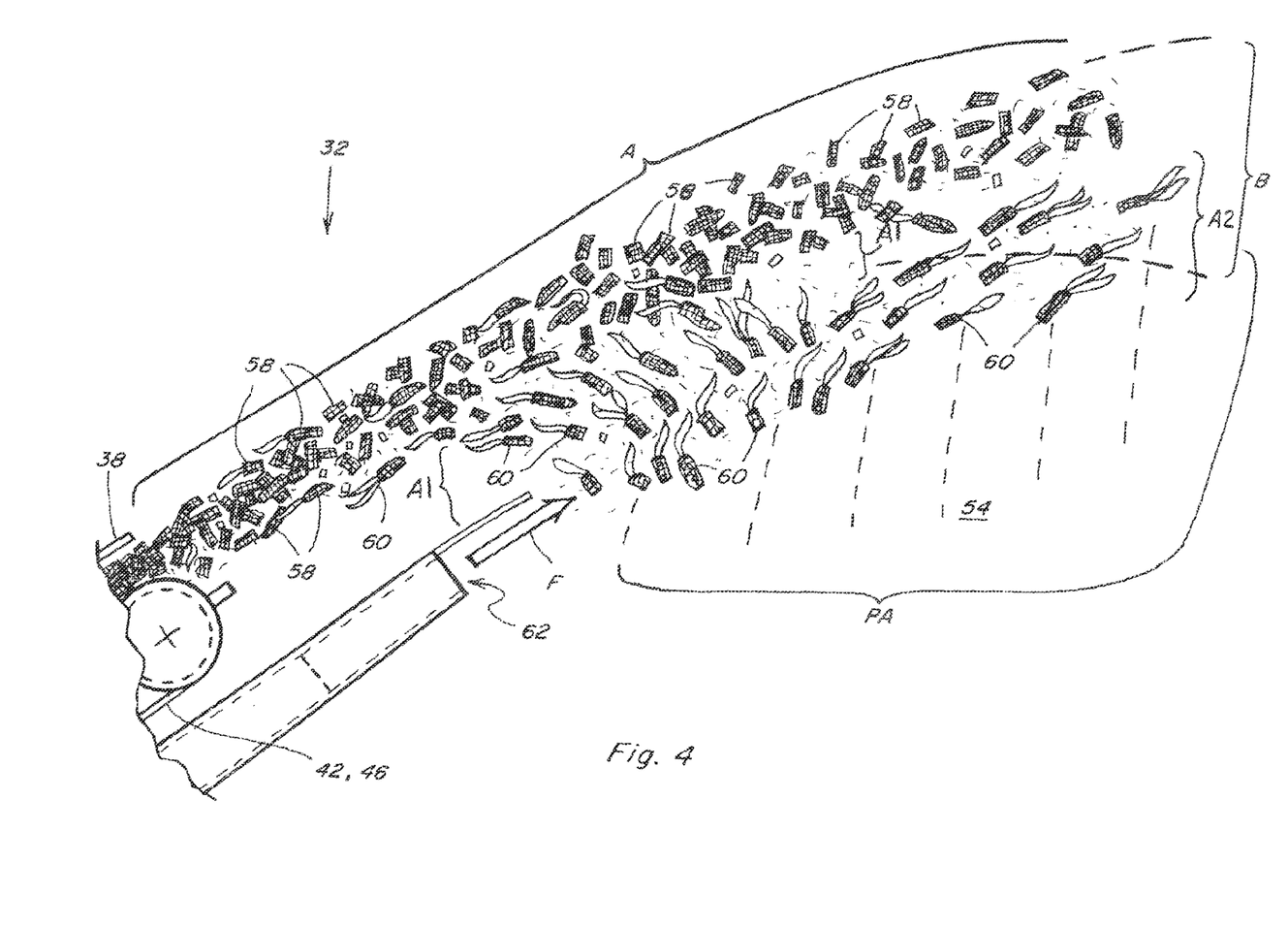
FIG. 4 is a simplified fragmentary schematic side view of the system, illustrating operation thereof.

Referring also to FIGS. 2, 3 and 4, machine 20 is shown a including a biomass feed system 32, constructed and operable according to the teachings of the present invention, for receiving the mixed flow A of biomass which is to be collected in a collection device 44. Here, system 32 is carried on a trailer 34 suitably supported on wheels 36, or tracks (not shown) and configured for towing by machine 20, for carrying aspects of system 32, including a conveyor system 38.

Conveyor system 38 of system 32 here includes a first inclined conveyor 40 and a second inclined conveyor 42, extending to cob collection device 44 also carried on the trailer, although it should be understood that the present invention can comprise any number of conveyors, and may or may not include the collection device itself. In this latter regard, as a non-limiting example, it is contemplated that a suitable collection device can alternatively be carried on a separate accompanying vehicle, if desired or required for a particular application. Conveyors 40 and 42 are depicted here as belt type conveyors, each of which includes an endless belt 46 which extends about a roller 48 at the lower end, and which is driven by a drive roller 50 at the upper end, which can be powered by a suitable drive, such as, but not limited to, a fluid or electric motor, belt, chain or the like, for moving the upper surface of the belt rearwardly carrying cobs and any other residue thereon toward collection device 44. To facilitate this, a front end of first conveyor 40 is disposed directly beneath discharge outlet 26 in the path of flow A. Conveyor 40 will then carry flow A and deposit it onto the front end of conveyor 42, which is a device operable to convey it upwardly and propel it from its elevated rear end 52, into an interior cavity 54 of device 44, airborne in a predetermined direction which here is generally rearwardly, generally along a trajectory B, which extends generally to a rear end 56 of cavity 54 so as to fall under the force of gravity.

As noted above, due to the differences in mass and aerodynamic characteristics it is expected that some of the lower mass and/or less aerodynamic elements of flow A may have a tendency to fall or drop from trajectory B, as denoted by A1 in FIG. 4, so as to travel a much shorter distance than those elements having greater mass and/or better aerodynamic properties. Particularly here, elements of the former category are depicted generally as cobs and cob fragments alone, that is, mainly without attached husks, denoted by 58, whereas elements of the latter category are depicted generally as cobs and cob fragments with attached husks or husk fragments, denoted by 60, and can additionally include loose husks and fragments, leaf trash, dust, and the like. As also explained above, this can result in an uneven mixture and distribution of the biomass within cavity 54, mainly with the lighter elements 60 more forwardly, and the heavier cobs 58 more rearwardly, which is undesirable for a variety of reasons.

To reduce or eliminate this problem, system 32 includes at least one air flow port 62 disposed generally below trajectory B and facing in the predetermined direction, which here is rearwardly, and at least one fan 64 configured and operable for discharging a flow of air F through port or ports 62 for creating a blanket of pressurized air PA within the interior cavity beneath, and preferably intermingled with or penetrating at least lower regions of trajectory B, for supporting and extending a distance of travel of the stalling or falling airborne elements 58 and 60 of biomass flow A1, as denoted by A2 within the interior cavity 54. This can be observed from the elevational transition of biomass elements 58, 60 from A1 to A2.

As an optional preferred aspect of the invention, collection device 44 additionally includes an air flow outlet or outlets 66 adjacent to a terminal end of trajectory B opposite conveyor 42 at or above an elevation thereof, and through which the air flow F will escape, and to which the pressurized air of blanket PA will flow, in a manner for improving the lifting and carrying at least some of the airborne biomass 56, 58 farther into interior cavity 54 as denoted by A2. As an alternative, various air outlets can be provided sized suitably to allow accumulation of a sufficient generally static air blanket PA within the region beneath trajectory B, for achieving the lifting and supporting effect sought for the present invention.

As can be observed in FIGS. 2 and 4, air flow port or ports 62 and fan or fans 64 can be configured to direct the flow of air F upwardly within a range of acute angles relative to horizontal, or to trajectory B, so as to intersect airborne flow A of the biomass in a manner for particularly lifting a substantial portion of flow A, as illustrated in FIG. 2, or more so as to just maintain the elevation of lower airborne elements 60 of portion A1 of the flow A generally within main trajectory B or just below, as illustrated in FIG. 4, in either case, so as to travel a greater distance than if allowed to fall earlier. This intersection of flows can occur immediately adjacent to rear end 52 of conveyor 42 which propels the biomass, so as to immediately lift the airborne flow A1, or it can occur at a more downstream location, for instance, but not limited to, where trajectory B begins to descend, just before that point, or farther along the descent of trajectory B.

As one exemplary configuration of the apparatus of system 32, in the embodiment illustrated in FIGS. 1 through 4, air flow port or ports 62 are located a distance downstream along trajectory B from rear end 52 of conveyor 42, and is/are oriented to direct airflow F at an upwardly oriented angle, to intersect airborne flow A at an even farther downstream location. Here, it should be noted that the necessary angular relationship between air flow F and biomass flow A can be determined for a particular application and as a function of a variety of factors. Additionally, it should be noted that as an alternative, air flow port or ports 62 can be located generally coincident with end 52 of conveyor 42, or at another location as desired or required for a particular application.

Here, it can be observed that fan 64 is a centrifugal type fan, and is located on trailer 34 substantially below air flow port or ports 62. To accommodate this, and air flow duct or tube 68 is used to connect fan 64 with port or ports 62 as illustrated.

Here also in reference to FIG. 3, port or ports 62 is/are illustrated as having a sideward extent SE which is the sideward extent of conveyor 42, although a greater or lesser sideward extent of the port or ports can be utilized as desired or required for achieving the desired or required lifting effect or biomass distribution. As also illustrated in FIG. 3, port or ports 62 can include vanes 70 oriented in a small acute sideward angle to the rearward direction, to effect better side to side distribution of the biomass within cavity 54.

Figure 5:
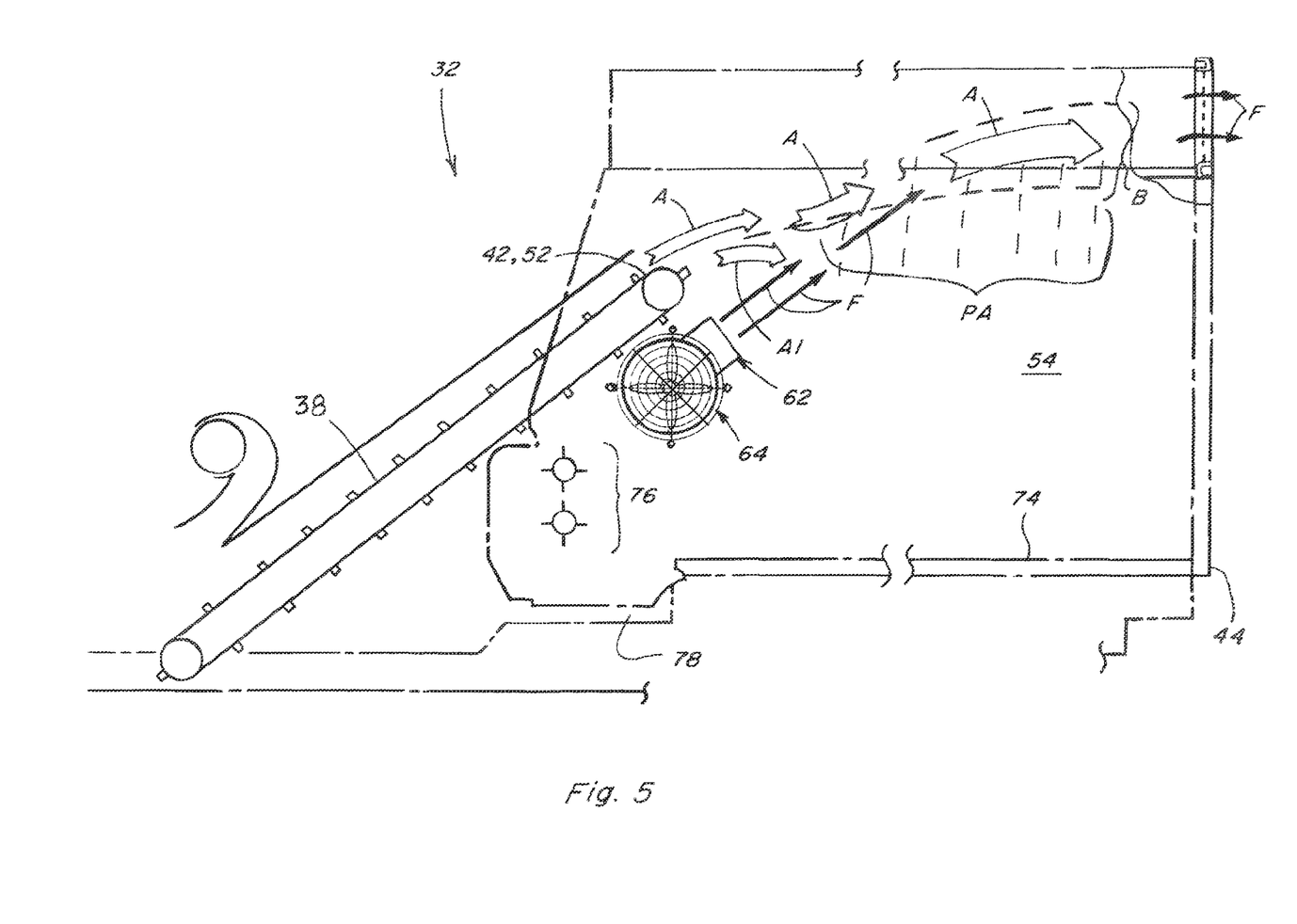
FIG. 5 is a simplified fragmentary side view of the system of the invention, including alternative fan apparatus, and showing aspects of operation with arrows.
Figure 6:
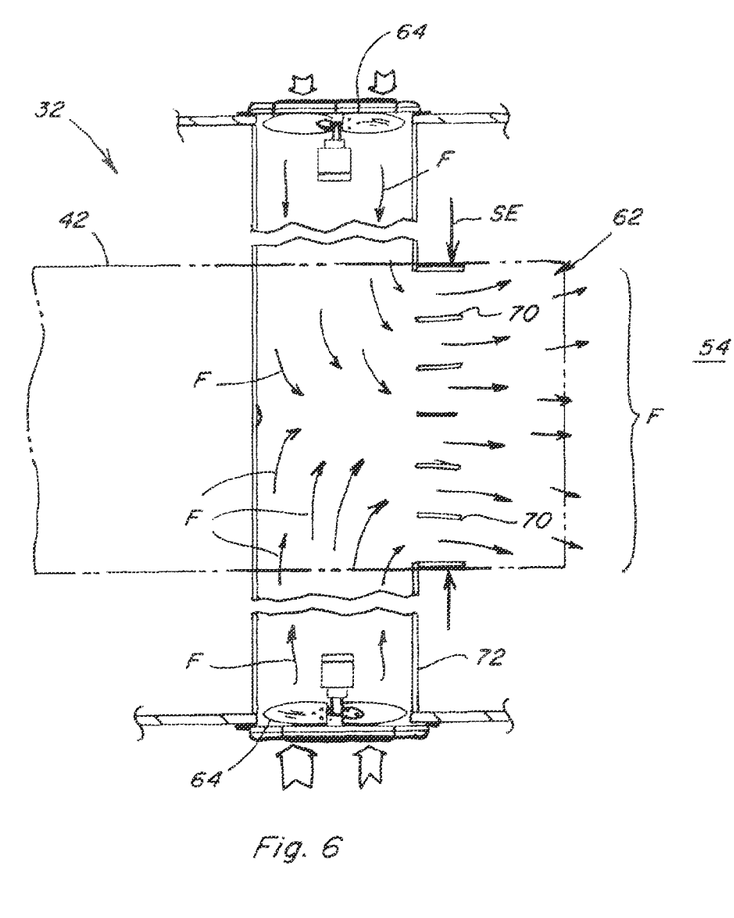
FIG. 6 is a simplified fragmentary top view of the system of FIG. 6, showing aspects of operation of the system with arrows.

Referring also to FIGS. 5 and 6, system 32 of the invention is illustrated having an alternative configuration of air flow port 62 and fans 64. Here, air flow port or ports 62 is/are located generally directly beneath rear end 52 of inclined conveyor 42, oriented so as to intersect trajectory B a short distance downstream from end 52. This results in creation of blanket of pressurized air PA just rearwardly of end 52 for supporting and lifting any falling portion of the biomass flow A1. Flow F can also be sufficient in volume and velocity for lifting and redirecting elements of biomass flow A as well, as illustrated by larger arrows A.

In this embodiment, two fans 64 are utilized, at opposite ends of a side to side extending air flow tube 72 including air flow port 62 in a rearwardly facing surface thereof. As a result, air flows F generated by respective fans 64 will converge adjacent port 62 and be discharged in the rearward direction therefrom, at the angle of inclination relative to horizontal illustrated in FIG. 5. Again, air flow port or ports 62 can have a desired configuration, and/or size, as desired or required for a particular application, here having a sideward extent SE about equal to that of conveyor 42. Additionally, vanes 70 can be provided in conjunction with port or ports 62 for directing a portion or portions of flow F sidewardly a small acute angle to the rearward direction, to achieve desired side to side biomass distribution within cavity 54.

Additionally, here it should be noted that collection device 44 can include a variety of apparatus for redistributing or distributing the collected biomass therein, for example, a live floor 74, as well as augers 76 and an unloader conveyor 78 for unloading the biomass. Here also, while the system of the present invention is depicted utilizing belt type conveyors for propelling biomass flow A into device 44, it should be recognized that a variety of alternative devices can be provided for this purpose, including, but not limited to, rotary beater type devices, straw walker type devices, and the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An agricultural harvesting machine with a trailer having a biomass feed system, the biomass feed system comprising:
   a collection device having an interior cavity with two opposing sides;
   a conveyor device that propels an airborne flow of the biomass in a predetermined direction along a trajectory within the interior cavity of said collection device;
   a blanket of pressurized air that supports the biomass within the interior cavity beneath the trajectory, and an airflow tube extending between the two opposing sides and having two fans at opposite ends of the tube that create the blanket of pressurized air, the airflow tube including airflow ports having a plurality of vanes that directs a portion of an airflow sidewardly at an acute angle relative to a rearward direction of the airflow tube, to achieve side by side biomass distribution in the interior cavity.

2. The system of claim 1, wherein the collection device comprises an air flow outlet adjacent to a terminal end of the trajectory opposite the collection device at or above an elevation thereof, through pressurized air will flow in a manner for lifting and carrying at least some of the airborne flow of the biomass farther into the interior cavity.

3. The system of claim 1, wherein the blanket of pressurized air is directed upwardly so as to intersect the flow of the biomass in a manner for lifting airborne elements of the biomass traveling along the trajectory.

4. The system of claim 1, wherein the blanket of pressurized air is located below the trajectory downstream of the device from which the flow of the biomass is propelled.

5. The system of claim 1, wherein sideward extent about equal to a sideward extent of the conveyor associated with the collection device.

\* \* \* \* \*